US006027210A

United States Patent [19]

Kurabayashi et al.

[11] Patent Number: 6,027,210

[45] Date of Patent: Feb. 22, 2000

[54] INK-JET RECORDING PROCESS USING LIQUID FORMULATION AND INK IN COMBINATION

[75] Inventors: Yutaka Kurabayashi, Tokorozawa; Yoshifumi Hattori, Yamato; Mayumi Yamamoto, Tokyo; Yoshihisa Takizawa, Machida; Shinya Mishina; Shinichi Sato, both of Kawasaki; Mikio Sanada; Katsuhiko Takahashi, both of Yokohama; Eriko Ono; Masashi Ogasawara, both of Kawasaki, all of Japan

[73] Assignee: Canon Kabushiki Kaisha, Tokyo, Japan

[21] Appl. No.: 08/900,834

[22] Filed: Jul. 25, 1997

[30] Foreign Application Priority Data

Aug. 2, 1996 [JP] Japan .................................... 8-219122

[51] Int. Cl.[7] .......................... G01D 11/800; C09D 11/00

[52] U.S. Cl. .................... 347/100; 106/31.75; 106/31.86

[58] Field of Search ............................. 106/31.27, 31.37, 106/31.51, 31.75, 31.86; 347/84, 95, 98, 100

[56] References Cited

U.S. PATENT DOCUMENTS

| | | | |
|---|---|---|---|
| 4,538,160 | 8/1985 | Uchiyama | 346/140 R |
| 4,694,302 | 9/1987 | Hackleman et al. | 346/1.1 |
| 5,549,740 | 8/1996 | Takahashi et al. | 106/20 R |
| 5,614,007 | 3/1997 | Kurabayashi et al. | 106/22 R |
| 5,618,338 | 4/1997 | Kurabayashi et al. | 347/100 |
| 5,624,484 | 4/1997 | Takahashi et al. | 347/100 |
| 5,700,314 | 12/1997 | Kurbayashi et al. | 347/100 |

FOREIGN PATENT DOCUMENTS

| | | |
|---|---|---|
| 0675178 | 10/1995 | European Pat. Off. . |
| 0697445 | 2/1996 | European Pat. Off. . |
| 55-65269 | 5/1980 | Japan . |
| 55-66976 | 5/1980 | Japan . |
| 58-128862 | 8/1983 | Japan . |
| 61-59911 | 12/1986 | Japan . |
| 61-59912 | 12/1986 | Japan . |
| 61-59914 | 12/1986 | Japan . |
| 63-22681 | 1/1988 | Japan . |
| 63-60783 | 3/1988 | Japan . |
| 63-299971 | 12/1988 | Japan . |
| 64-9279 | 1/1989 | Japan . |
| 64-63185 | 3/1989 | Japan . |

*Primary Examiner*—William Royer
*Assistant Examiner*—Hoang Ngo
*Attorney, Agent, or Firm*—Fitzpatrick, Cella, Harper & Scinto

[57] ABSTRACT

Provided is an ink-jet recording process for forming a color image on a recording medium using a liquid formulation and a color ink in combination, wherein the liquid formulation contains a cationic polymer having a weight-average molecular weight in the range of from 400 to 1,400, and the liquid formulation and the ink are each ejected from a recording head having an ink ejection volume per dot of from 2 to 25 picolitters.

18 Claims, 6 Drawing Sheets

INK-JET RECORDING PROCESS USING LIQUID FORMULATION AND INK IN COMBINATION

BACKGROUND OF THE INVENTION

1. Field of the Invention

This invention relates to an ink-jet recording process carried out using a liquid formulation and an ink (color ink) in combination. More particularly, it relates to an ink-jet recording process carried out using a liquid formulation and an ink (color ink) in combination by applying the liquid formulation and the ink (color ink) together to a recording medium (e.g., plain paper) to form a color image that is less causative of the phenomenon of color bleeding and has water fastness.

2. Related Background Art

Ink-jet recording is a process of making a record by ejecting minute droplets of ink and adhering the ink to a recording medium such as paper. In particular, an ink-jet recording process of the type as disclosed in Japanese Patent Publication No. 61-59911, No. 61-59912 and No. 61-59914, i.e., of the type in which a heat energy is imparted to ink by using an electrothermal transducer as an ejection energy feeding means to cause the ink to bubble to eject droplets, enables easy materialization of high-density multi-orifice recording head, and hence images with a high resolution and a high quality level can be recorded at a high speed.

However, inks used in conventional ink-jet recording are commonly mainly composed of water and to which water-soluble high-boiling solvents such as glycol are added for the purposes of, e.g., preventing inks from drying and preventing orifices from clogging. When a record is made on a recording medium using such ink, problems have occurred such that no sufficient fixing performance may be attained, or uneven images may occur which are presumed to be due to uneven distribution of fillers and sizing agents on the surface of the recording medium. Especially when color images are to be obtained, a plurality of color inks are successively superimposed on the recording medium before inks with certain colors become fixed thereon, and hence there has been a problem that colors may blur or unevenly mix at boundaries between images with different colors (this phenomenon is hereinafter called "bleeding ") to make it difficult to obtain satisfactory images.

As a means for improving fixing performance to cope with such problems, Japanese Patent Application Laid-open No. 55-65269 discloses a method in which a compound capable of increasing its permeation, such as a surface active agent, is added in ink. Japanese Patent Application Laid-open No. 55-66976 also discloses use of an ink mainly composed of a volatile solvent. In the former method, in which a surface active agent is added in ink, fixing performance and bleeding can be improved and prevented to a certain extent as a result of the increase in ink permeation into the recording medium. However, coloring materials in the ink also permeate into the recording paper to a great depth to cause difficulties such as a decrease in image optical density and a lowering of chroma. In addition, it also cause a spread of ink in the lateral direction, which consequently may also cause the problems of a decrease in edge sharpness of dots and a lowering of resolution. As for the latter method, in which an ink mainly composed of a volatile solvent is used, not only the difficulties occurring in the former method may occur, but also clogging due to evaporation of solvents undesirably tends to occur at nozzles of the recording head, undesirably.

To overcome such problems, methods are also proposed in which a liquid that enables formation of good images is previously applied to the recording medium before ink is ejected. For example, Japanese Patent Application Laid-open No. 58-128862 discloses an apparatus in which a liquid that can improve ink fixing performance is superimposingly applied to ink recording positions by the use of a recording head different from ink ejecting heads. Japanese Patent Application Laid-open No. 63-60783 also discloses a method in which a liquid having a basic polymer is applied and thereafter an ink containing an anionic dye is applied to make a record. Japanese Patent Application Laid-open No. 63-22681 still also discloses a recording method in which a first liquid containing reactive chemical species and a liquid containing a compound capable of reacting with the reactive chemical species are mixed on a recording medium. Japanese Patent Application Laid-open No. 63-299971 further discloses a method in which a liquid containing an organic compound having at least two cationic groups per molecule are applied to the recording medium and thereafter the recording is performed using an ink containing an anionic dye. Japanese Patent Application Laid-open No. 64-9279 also discloses a method in which an acidic liquid containing succinic acid or the like is applied onto a recording medium and thereafter the recording is performed using an ink containing an anionic dye. Japanese Patent Application Laid-open No. 64-63185 still also discloses a method in which a liquid containing a cationic polymer and capable of making dyes insoluble by aggregation is imparted to the recording medium before the ink is imparted thereto.

Meanwhile, as means for making images highly minute, various methods have been proposed. With an improvement in resolution of ink-jet recording, a method is becoming prevailing in which ink ejection volume per dot of a recording head is made smaller than ever. For example, as regards the resolution, the pursuit thereof advances from 300 dpi and 360 dpi toward 600 dpi, 720 dpi and much higher resolution. Concurrently with this, as regards the ink ejection volume per dot, the pursuit of recording heads continues toward 40 pl, 25 pl and much smaller ejection volume.

Under such circumstances, also in plain-paper color recording techniques in which as previously stated a liquid formulation different from ink is imparted to ink recording positions by the use of an ink-jet recording head so that various performances of ink-jet recorded images on the recording medium can be improved, it is sought to more improve the reliability of liquid formulations for aggregating the dyes or pigments in inks, the reliability including not only frequency characteristics, ejection stability and durability, but also the properties of hardly causing clogging (in the present invention, hereinafter called "anti-sticking performance ") and ejection stability required after a pause of recording for a certain period of time (in the present invention, called "start-up performance ").

However, when any component, e.g., the cationic polymer, used in the liquid formulation for aggregating the dyes or pigments in inks as disclosed in the prior art is applied in the recording head for highly minute recording as stated above, having a small ink ejection volume per dot, e.g., having 2 to 25 pl ink ejection volume per dot, it has been difficult to satisfy the reliability of the liquid formulations, such as frequency characteristics, ejection stability, durability, anti-sticking performance and start-up performance.

SUMMARY OF THE INVENTION

Accordingly, an object of the present invention is to provide an ink-jet recording process carried out by using a liquid formulation and an ink in combination, the liquid formulation being the one that can satisfy the reliability such as frequency characteristics, ejection stability, durability, anti-sticking performance and start-up performance even when the recording head as stated above is used, having a small ink ejection volume per dot, e.g., having 2 to 25 pl (picolitter) ink ejection volume per dot.

The above object can be achieved by the invention described below.

That is, the present invention provides an ink-jet recording process for forming a color image on a recording medium using a liquid formulation and a color ink in combination, wherein the liquid formulation contains a cationic polymer having a weight average molecular weight in the range of from 400 to 1,400, and said liquid formulation and said ink are each ejected from a recording head having an ink ejection volume per dot of from 2 to 25 pl (picolitter).

DESCRIPTION OF THE PREFERRED EMBODIMENTS

Figure 1:
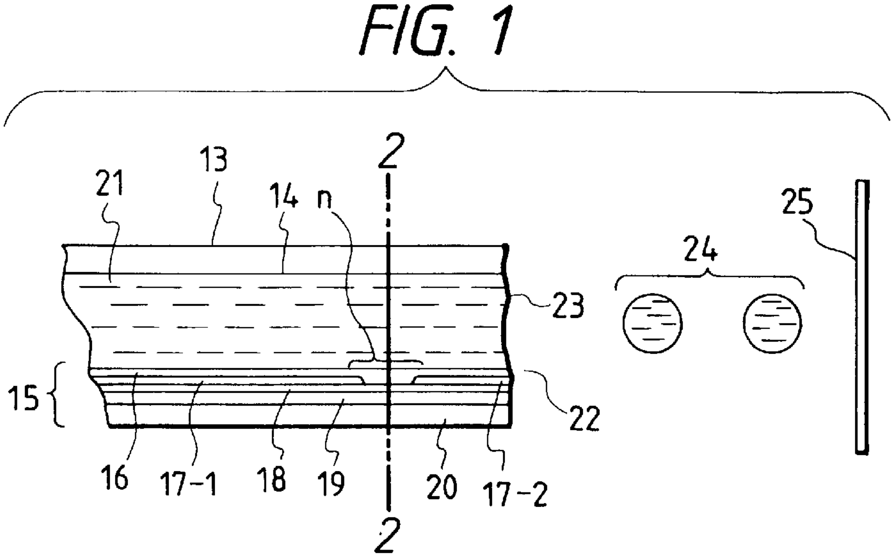
FIG. 1 is a longitudinal cross section of a head assembly of an ink-jet recording apparatus.

According to the present invention, especially in a recording process carried out by using a recording head having an ink ejection volume per dot of from 2 to 25 pl and using a liquid formulation containing a cationic polymer, and a color ink in combination, a liquid formulation containing a cationic polymer having a weight-average molecular weight in the range of from 400 to 1,400 is used. This makes it possible to improve the image optical density, image uniformity, color bleeding prevention and durability of images on recording media, and also to satisfy various reliability, i.e., ejection stability (frequency characteristics), ejection durability, start-up performance and anti-sticking performance.

The reason why such a liquid formulation used in the present invention has the remarkable effect as stated above is unclear. It is presumed that the following phenomenon occurs between the cationic polymer contained in the liquid formulation and the coloring matter contained in the ink and consequently the above operational effect is brought about.

That is, when an ink containing a water-soluble dye having an anionic group is used as the ink, a low-molecular weight component of the cationic polymer in the liquid formulation combines with the dye by ionic and/or molecular mutual action to cause separation of the dye from the liquid phase, thus aggregates of the dye are formed. Also in the case of a pigment ink containing an anionic compound, a low-molecular weight component of the cationic polymer in the liquid formulation combines with the pigment by ionic and/or molecular mutual action to cause dispersion failure of the pigment, thus aggregates of the pigment are formed.

Then, the aggregates of the dye or the aggregates of the pigment are subsequently adsorbed on a high-molecular weight component of the cationic polymer to form aggregates with a larger size, so that it becomes difficult for these aggregates to enter the gaps between fibers of a recording medium such as paper, and hence the mobility of the dye or pigment on the recording medium become very smaller than the mobility of solvent. Thus, since this reaction takes place at a very high rate, it becomes possible to form the above high-grade images by ink-jet recording, as so presumed.

At the same time, the aggregates themselves produced by the mechanism as stated above, formed of the cationic polymer and the anionic dye or the anionic compound and pigment in the pigment ink, come to have a lower fluidity and do not migrate concurrently with the movement of the liquid medium of the ink. Hence, even when adjoining dots are formed of inks with different colors as in the case when full-color images are formed, they by no means mix one another, and the bleeding may occur with difficulty. Also, since the above aggregates are substantially water-insoluble, the images formed can have a very improved water fastness.

In carrying out the present invention, since the cationic polymer having a weight average molecular weight of from 400 to 1,400 is used, the liquid formulation containing such a cationic polymer can be free from an increase in viscosity. This is advantageous for ejection performances such as frequency response, stable ejection volume and stable ejection velocity when the liquid formulation is applied to the recording medium by the use of an ink-jet recording head, in particular, an On-Demand type thermal ink-jet recording head. Also, it is unnecessary to use polybasic metal salts in order to make coloring matters aggregate or insoluble, and hence there is an advantage such that no problem of kogation (scorching) may occur on the heating heads. This can be an additional effect attributable to the present invention.

The present invention will be described below in greater detail by giving preferred embodiments.

The liquid formulation used in the present invention will be described first. As the cationic polymer used in the liquid formulation, a cationic polymer having a weight average molecular weight in the range of from 400 to 1,400 is used. So long as the liquid formulation containing such a cationic polymer is used, the various reliability as stated previously can be attained even when used in a recording head having such a small ejection orifice area that its liquid ejection volume per dot is 2 to 25 pl.

The reason therefor is as follows: The cationic polymer having a weight average molecular weight of from 400 to 1,400 is so much highly water-soluble that the liquid formulation may be difficult stuck on nozzle tips on account of a low viscosity of aqueous polymer solution even when water evaporates from the nozzle tips, and also that the liquid formulation can be controlled to have a low initial viscosity and evaporation viscosity. As the result, the reliability such as anti-sticking performance, ejection frequency response and start-up performance can be ensured in actual use.

In the present invention, the cationic polymer has the weight average molecular weight in the above range, but the polymer may preferably not have a narrow molecular weight distribution, but contain a polymer with a relatively low molecular weight and a polymer with a relatively high molecular weight. The reason therefor is as previously stated. A mixture of cationic polymers having such different molecular weights may preferably be divided into a plurality of fractions, e.g., a low-molecular region and a high-molecular region, when the molecular weight distribution of the mixture is measured by GPC (gel permeation chromatography).

The cationic polymer used in the present invention may include, e.g., polyallylamine, polyamine sulfone, a copolymer of these, and polyvinylamine. Of these, polyallylamine is preferably used in the present invention, which especially enables easy control of molecular weight and molecular weight distribution. The weight average molecular weight referred to in the present invention means a weight average molecular weight measured by GPC using polyethylene glycol as the standard.

The liquid formulation used in the present invention is prepared by dissolving in an aqueous medium the cationic polymer as described above. In the aqueous medium, the cationic polymer may be in a concentration ranging usually from about 1 to 10% by weight, and preferably from about 2 to 6% by weight. If the cationic polymer is in a too high concentration, the resultant liquid formulation may have a too high viscosity. If on the other hand the cationic polymer is in a too low concentration, the water fastness of images, color bleeding prevention and so forth on the recording medium can not be satisfactory.

The aqueous medium in which the cationic polymer is dissolved may be a mixed solvent of water and a water-soluble organic solvent. As the water, it is preferable to use not usual city water containing various ions, but ion-exchanged water (deionized water).

The water-soluble organic solvent used as a mixture with water may include, e.g., alkyl alcohols having 1 to 4 carbon atoms, such as methyl alcohol, ethyl alcohol, n-propyl alcohol, isopropyl alcohol, n-butyl alcohol, sec-butyl alcohol and tert-butyl alcohol; amides such as dimethylformamide and dimethylacetamide; ketones or keto-alcohols such as acetone and diacetone alcohol; ethers such as tetrahydrofuran and dioxane; polyalkylene glycols such as polyethylene glycol and polypropylene glycol; alkylene glycols the alkylene group of which has 2 to 6 carbon atoms, such as ethylene glycol, propylene glycol, butylene glycol, triethylene glycol, hexylene glycol and diethylene glycol; 1,2,6-hexanetriol; thiodiglycol; glycerol; lower alkyl ethers of polyhydric alcohols, such as ethylene glycol monomethyl or -ethyl ether, diethylene glycol methyl or ethyl ether and triethylene glycol monomethyl or -ethyl ether; and also N-methyl-2-pyrrolidone, 2-pyrrolidone, and 1,3-dimethyl-2-imidazolidinone. Of these many water-soluble organic solvents, polyhydric alcohol such as diethylene glycol, and lower alkyl ethers of polyhydric alcohols such as triethylene glycol monomethyl or -ethyl ether are particularly preferred.

The water-soluble organic solvent as described above may be contained in an amount ranging usually from 3 to 50% by weight, and preferably from 3 to 40% by weight, based on the total weight of the liquid formulation. The water may be contained in an amount ranging from 10 to 90% by weight, and preferably from 30 to 80% by weight, based on the total weight of the liquid formulation.

In the present invention, it has been also discovered that the start-up performance stated previously can be more improved when a water-soluble organic solvent such as a triethylene glycol monoalkyl ether or a diethylene glycol monoalkyl ether is used in the liquid formulation in a proportion of from 0.5 to 5% by weight. Such a water-soluble organic solvent may specifically include, e.g., triethylene glycol monobutyl ether, triethylene glycol monomethyl ether, diethylene glycol monobutyl ether, and diethylene glycol monomethyl ether. In particular, triethylene glycol monobutyl ether or diethylene glycol monobutyl ether is more preferred.

In the liquid formulation, glycerol may preferably be used for the purpose of improving the anti-sticking performance attributable to the cationic polymer such as polyallylamine. The glycerol may preferably be contained in an amount ranging from 2 to 10% by weight based on the total weight of the liquid formulation.

In the liquid formulation used in the present invention, an amine having 8 or more carbon atoms may preferably be incorporated. Of the amine, it is more preferable to use a quaternary amine. When such an amine is incorporated, although the reason is unclear, heating heads in ink-jet recording apparatus can be made to have a remarkably long lifetime, a liquid formulation stable for a long period time can be obtained and the ejection stability can be ensured.

Such a quaternary amine may include, e.g., quaternary ammonium salt type compounds, stated specifically, lauryltrimethylammonium chloride, lauryldimethylbenzylammonium chloride, benzyltributylammonium chloride and benzalkonium chloride; pyridinium salt type compounds, stated specifically, cetyl pyridinium chloride and cetyl pyridinium bromide. Of these, benzalkonium chloride is particularly preferred. The quaternary amine in the liquid formulation may be in a concentration ranging usually from 0.1 to 5% by weight, and preferably from 0.2 to 2% by weight.

The liquid formulation used in the present invention may preferably have a pH in the range of from 3 to 11, and more preferably a pH in the range of from 6 to 9. A pH adjuster used to provide such a pH range may include, e.g., acids such as acetic acid, hydrochloric acid, p-toluenesulfonic acid, lactic acid and propionic acid, but without limitation to these. The liquid formulation used in the present invention may also preferably have a surface tension in the range of from 25 to 50 dyn/cm, and more preferably from 30 to 40 dyn/cm. The liquid formulation used in the present invention may also preferably have a viscosity in the range of from 1.3 to 5 cP (centi poise), and more preferably from 1.5 to 3 cP.

The coloring matter-containing ink used in the present invention in combination with the liquid formulation described above will be described below.

In the ink used in the present invention, it is preferable to use as the coloring matter a water-soluble dye containing an anionic group, or, when a pigment is used as the coloring matter, to use an anionic compound in combination with the pigment. Such an ink used in the present invention may further optionally contain water, a water-soluble organic solvent and other components as exemplified by a viscosity modifier, a pH adjuster, an antifungal agent, a surface active agent and an antioxidant.

As the water-soluble dye having an anionic group, used in the present invention, may be any of water-soluble acid dyes, direct dyes and reactive dyes listed in the COLOUR INDEX, without any particular limitations so long as they are water-soluble dyes having an anionic group. Dyes not listed in the COLOUR INDEX may also be used without any particular limitations so long as they are those having an anionic group, e.g., a sulfonic group or a carboxyl group. The water-soluble dye herein referred to also includes of course those having a dependence of solubility on pH.

As the water-soluble organic solvent contained in the ink in which the water-soluble dye as described above is contained, the water-soluble organic solvent used in the liquid formulation previously described may be used similarly. The content of such a water-soluble organic solvent in the ink may be in the same preferable range as in the case of the liquid formulation used in the present invention. The ink may also have physical properties in entirely the same range as in the case of the liquid formulation. However, with regard to surface tension of the ink, the ink may preferably be made to have a higher surface tension than the surface tension of the liquid formulation of the present invention since the recording process of the present invention can be thereby effectively carried out in some cases. This is presumably because, when the surface tension of the both is controlled in this way, the liquid formulation which is shot first in the printing process exhibits such an effect that the ink which is shot later can have a uniform wettability on the recording medium, though details are unknown.

In the present invention, in the case when the ink containing a pigment is used, an anionic compound such as an anionic surface active agent or an anionic polymeric substance may preferably be added besides the components described above in respect of the dye-containing ink. An amphoteric surface active agent may be incorporated after its pH is adjusted to a pH not lower than its isoelectric point. As examples of the anionic surface active agent used in such an instance, any of those commonly used may be preferably used, including carboxylic acid salt types, sulfuric acid ester types, sulfonic acid salt types and phosphoric acid ester types. As examples of the anionic polymer, it may include alkali-soluble resins, stated specifically, potassium polyacrylate or those prepared by partial copolymerization of a polymer with acrylic acid, but without limitations thereto of course.

In the case when the pigment is used as the coloring matter of the ink used in the present invention, the pigment may be used in an amount ranging from 1 to 20% by weight, and preferably from 2 to 12% by weight, in weight ratio, based on the total weight of the ink.

The pigment used in the present invention may specifically include carbon black as a pigment used in black ink, as exemplified by carbon black produced by the furnace process or the channel process. Those having properties such as a primary particle diameter of from 15 to 40 m$\mu$, a specific surface area of from 50 to 300 $m^2/g$ as measured by the BET method, a DBP oil absorption of from 40 to 150 ml/100 g, a volatile content of from 0.5 to 10% and a pH value of from 2 to 9 may preferably be used. Commercially available products having such properties are exemplified by No. 2300, No. 900, MCF88, No. 33, No. 40, No. 45, No. 52, MA7, MA8, and No. 2200B (trade names; all available from Mitsubishi Chemical Industries Limited); RAVEN 1255 (trade name; available from Columbian Carbon Japan Limited); REGAL 400R, REGAL 330R, REGAL 660R, and MOGUL L (trade names; all available from Cabot Corp.); COLOR BLACK FW1, COLOR BLACK FW18, COLOR BLACK S170, COLOR BLACK S150, PRINTEX 35, and PRINTEX U (trade names; all available from Degussa Japan Co., Ltd.), any of which may preferably be used.

As a pigment used in yellow ink, it may include, e.g., C.I. Pigment Yellow 1, C.I. Pigment Yellow 2, C.I. Pigment Yellow 3, C.I. Pigment Yellow 13, C.I. Pigment Yellow 16 and C.I. Pigment Yellow 83. As a pigment used in magenta ink, it may include, e.g., C.I. Pigment Red 5, C.I. Pigment Red 7, C.I. Pigment Red 12, C.I. Pigment Red 48 (Ca), C.I. Pigment Red 48 (Mn), C.I. Pigment Red 57 (Ca), C.I. Pigment Red 112 and C.I. Pigment Red 122. As a pigment used in cyan ink, it may include, e.g., C.I. Pigment Blue 1, C.I. Pigment Blue 2, C.I. Pigment Blue 3, C.I. Pigment Blue 15:3, C.I. Pigment Blue 16, C.I. Pigment Blue 22, C.I. Vat Blue 4 and C.I. Vat Blue 6. Examples are by no means limited to these. In addition to the foregoing, it is of course possible to use pigments newly produced for the present invention.

As a dispersant incorporated in the ink when the pigment is used, any of water-soluble resins may be used. It is preferable to use those having a weight average molecular weight in the range of from 1,000 to 30,000, and more preferably from 3,000 to 15,000. Such dispersants may specifically include block copolymers, random copolymers or graft copolymers comprised of at least two monomers (at least one of which is a hydrophilic monomer) selected from styrene, styrene derivatives, vinyl naphthalene, vinyl naphthalene derivatives, aliphatic alcohol esters of ethylenically unsaturated $\alpha,\beta$-carboxylic acids, acrylic acid, acrylic acid derivatives, maleic acid, maleic acid derivatives, itaconic acid, itaconic acid derivatives, fumaric acid, fumaric acid derivatives, vinyl acetate, vinyl pyrrolidone, acrylamide, and derivatives thereof; or salts of these. Natural resins such as rosin, shellac and starch may also preferably be used. These resins are alkali-soluble resins which are soluble in an aqueous solution in which a base has been dissolved. Any of these water-soluble resins used as dispersants for the pigment may preferably be contained in an amount ranging from 0.1 to 5% by weight based on the total weight of the ink.

In the case of the ink containing the pigment, it is preferable for the whole ink to be adjusted to neutrality or the alkaline side. By doing so, the solubility of the water-soluble resin used as the pigment dispersant can be improved to obtain inks having a much better long-term storage stability. Its pH may preferably be adjusted in the range of from 7 to 10.

As pH adjusters used in such adjustment, they may include, e.g., various organic amines such as diethanolamine and triethanolamine, inorganic alkali agents including alkali metal hydroxides such as sodium hydroxide, lithium hydroxide and potassium hydroxide, and various organic acids and mineral acids.

The pigments and dispersants as described above are dispersed or dissolved in an aqueous medium. Here, as the aqueous medium preferably usable in the pigment-containing inks, the aqueous medium used in the liquid formulation previously described may be used similarly. The content of the water-soluble organic solvent in the ink may be in the same preferable range as that of the liquid formulation. The ink may also have physical properties in entirely the same range as in the case of the liquid formulation.

With regard to surface tension of the ink, addition of a lower alcohol and so forth, too, they may be the same as those in the case of the dye-containing inks. However, with regard to the addition of a lower alcohol, the solvent may be added in a dispersion of the pigment, whereby bubbles can be prevented from occurring at the time of dispersion treatment and the dispersion treatment can be efficiently carried out.

The water-soluble organic solvent may be contained in the pigment-containing ink in an amount ranging usually from 3 to 50% by weight, and preferably from 3 to 40% by weight, based on the total weight of the ink. The water may be contained in an amount ranging from 10 to 90% by weight, and preferably from 30 to 80% by weight, based on the total weight of the ink.

In the case when the pigment dispersant incorporated in the ink is not an anionic compound, the anionic compound must be further added in the ink. The anionic compound preferably usable in the present invention may include the polymeric substances such as alkali-soluble resins described in respect of the pigment dispersant and besides low-molecular weight anionic surface active agents.

As specific examples of the low-molecular weight anionic surface active agents, they may include dodecyl disodium sulfosuccinate, polyoxyethylene lauroyl ethanolamide disodium sulfosuccinate, polyoxyethylene alkyl disodium sulfosuccinates, carboxylated polyoxyethylene dodecyl ether sodium salts, polyoxyethylene dodecyl ether sodium sulfate, polyoxyethylene dodecyl ether triethanolamine sulfate, polyoxyethylene alkyl ether sodium sulfates, alkyl sodium sulfates and triethanolamine alkyl sulfates, but are by no means limited to these.

The anionic compound as described above may preferably be contained in the ink in an amount ranging from 0.05 to 10% by weight, and more preferably from 0.05 to 5% by weight, based on the total weight of the ink.

In addition to the above components, the ink containing the pigment as used in the present invention may be optionally appropriately incorporated with a surface active agent, a defoaming agent, an antiseptic and so forth in order to make the ink have the desired physical properties. In addition to the above pigment, a water-soluble dye or the like may also be appropriately added as the coloring matter.

The surface active agent added in the ink in such an instance may include anionic surface active agents such as fatty acids, higher alcohol sulfates, liquid fatty acid sulfates and alkylallyl sulfonates; and nonionic surface active agents such as polyoxyethylene alkyl ethers, polyoxyethylene alkyl esters, polyoxyethylene sorbitan alkyl esters, acetylene alcohols and acetylene glycol; at least one of which may be used under appropriate selection. It may preferably be used in an amount of approximately from 0.01 to 5% by weight based on the total weight of the ink, which may vary depending on the type of the dispersant incorporated in the ink. In this instance, the amount of the surface active agent may preferably be so determined that the ink may have a surface tension of 30 dyn/cm or above. This is because, if the ink shows a surface tension smaller than this value, it may bring about undesirable results, e.g., print slippage (positional deviation of ink-droplet impact) due to nozzle-tip wetting, when recorded by the ink-jet recording system employed in the present invention.

The ink containing the pigment as described above may be prepared in following way: First, the pigment is added to the aqueous medium comprised of at least the dispersant water-soluble resin and the water, and the resultant mixture is stirred, followed by dispersion by a dispersion means described later and optionally centrifugation to obtain a desired dispersion. Next, to this dispersion, a sizing agent and the additive components as previously described and appropriately selected are added, followed by stirring to form the ink used in the present invention.

In the case when the alkali-soluble resin is used as the dispersant, it is necessary to add a base in order to dissolve the resin. In this instance, an amine or base for dissolving the resin must be added in at least one-fold amount of the weight of the amine or base, the weight being found by calculation from the acid value of the resin. The weight of the amine or base is found by the following expression.

$$\text{Weight (g) of amine or base} = [\text{acid value of resin} \times \text{molecular weight of amine or base} \times \text{resin weight (g)}]/5{,}600$$

In addition, before the aqueous mixture containing the pigment is dispersed, the mixture may be premixed for at least 30 minutes to thereby improve dispersion efficiency. This pre-mixing is carried out to improve the wettability of pigment surfaces and accelerate the adsorption of the dispersant on the pigment surfaces.

The dispersion means used when the pigment is dispersed as described above may be any of dispersion machines commonly used, including, e.g., a ball mill, a roll mill and a sand mill. In particular, a high-speed type sand mill may preferably be used. Such a sand mill may include Super Mill, Sand Grinder, Beads Mill, Agitator Mill, Grain Mill, Daino Mill, Pearl Mill and Coball Mill (all trade names).

As the recording medium used in the recording process of the present invention, there are no particular limitations thereon. What is called plain paper such as paper for copying and bond paper conventionally used may preferably be used. Of course, coated papers specially prepared for ink-jet recording or OHP transparent films may also preferably be used. Usual woodfree paper and glossy paper may still also preferably be used.

A recording apparatus preferably usable in the recording process of the present invention will be described below.

Figure 2:
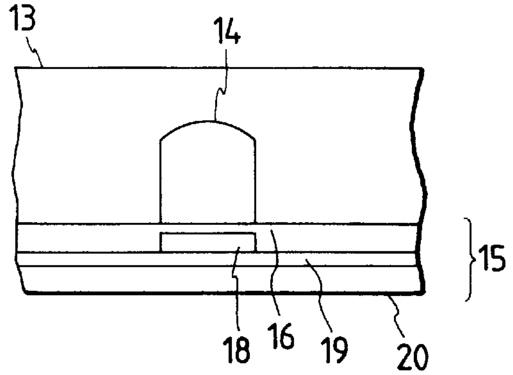
FIG. 2 is a transverse cross section of the head assembly of an ink-jet recording apparatus.
Figure 3:
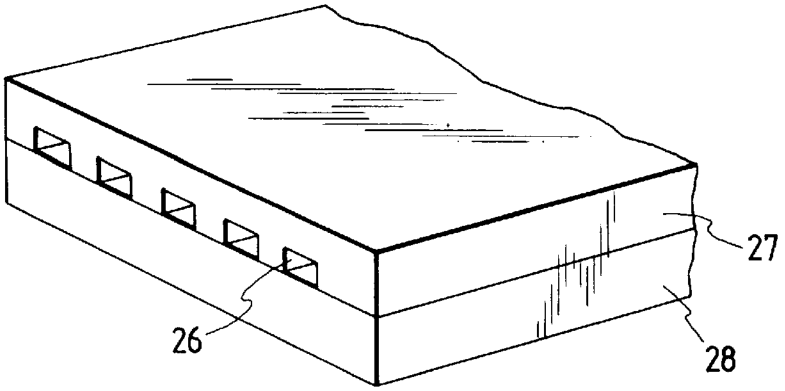
FIG. 3 is a perspective illustration of the appearance of a multi-head assembly comprised of the head assembly shown in FIG. 1.

In the present invention, preferably used is an ink-jet recording process in which recording signals are imparted to the liquid formulation (or ink) in the recording head to eject ink droplets therefrom by the action of heat energy thereby produced. FIGS. 1, 2 and 3 show the construction of the recording head, which is a main component of such an apparatus.

In FIG. 1, a head 13 is formed by bonding a glass, ceramic or plastic plate or the like having a groove 14 through which an ink is passed, to a heating head 15, which is used for thermal recording (in FIGS. 1 and 2, an illustrative example is shown, however, the invention is not limited). The heating head 15 is composed of a protective film 16 made of silicon oxide or the like, aluminum electrodes 17-1 and 17-2, a heating resistor layer 18 made of nichrome or the like, a heat accumulating layer 19, and a substrate 20 made of alumina or the like having a good heat radiating property.

An ink 21 comes up to an ejection orifice (a minute opening) 22 and forms a meniscus 23 due to a pressure P.

Now, upon application of electric signals to the electrodes 17-1 and 17-2, the heating head 15 rapidly generates heat at the region shown by n to form bubbles in the ink 21 which is in contact with this region. The meniscus 23 of the ink is projected by the action of the pressure thus produced, and the ink 21 is ejected from the orifice 22 to a recording medium 25 in the form of ink droplets 24.

The multi-head as illustrated in FIG. 3 is formed by closely bonding a glass plate 27 having a number of channels 26 to a heating head 28 similar to the head as illustrated in FIG. 1.

FIG. 1 is a cross-sectional view of a head 13 taken along the flow path of the ink, and FIG. 2 is a cross-sectional view taken along line 2—2 in FIG. 1.

Figure 4:
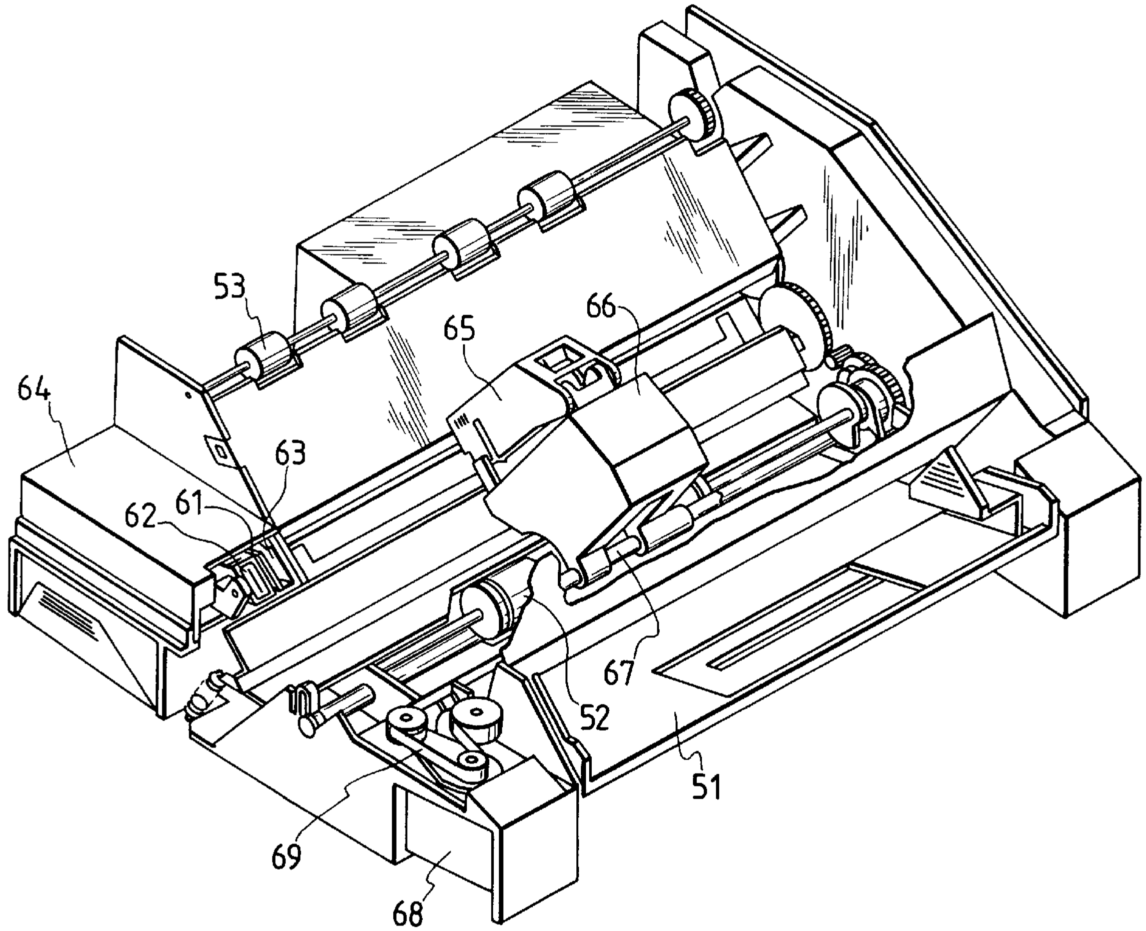
FIG. 4 is a perspective illustration of an example of an ink-jet recording apparatus.

FIG. 4 illustrates an example of an ink-jet recording apparatus in which such a head has been incorporated.

In FIG. 4, reference numeral 61 designates a blade serving as a wiping member, one end of which is a stationary end held by a blade-holding member to form a cantilever. The blade 61 is provided at a position adjacent to a region in which the recording head 65 operates, and in this embodiment, is held in such a form that it protrudes into the course through which the recording head 65 is moved. Reference numeral 62 indicates a cap, which is provided at a home position adjacent to the blade 61, and is so constituted that it moves in a direction perpendicular to a direction in which the recording head 65 is moved and comes into contact with the face of ejection openings to cap it. Reference numeral 63 designates an ink-absorbing member provided adjoiningly to the blade 61 and, similar to the blade 61, held in such a form that it protrudes into the course through which the printing head 65 is moved. The above-described blade 61, cap 62 and absorbing member 63 constitute an ejection-recovery portion 64, where the blade 61 and absorbing member 63 remove water, dust and/or the like from the face of the ink-ejecting openings.

Reference numeral 65 designates the recording head having an ejection-energy-generating means and serving to eject the ink onto the recording medium set in an opposing relation to the ejection opening face provided with ejection openings to conduct recording. Reference numeral 66 indicates a carriage on which the recording head 65 is mounted so that the recording head 65 can be moved. The carriage 66 is slidably interlocked with a guide rod 67 and is connected (not illustrated) at its part to a belt 69 driven by a motor 68. Thus, the carriage 66 can be moved along the guide rod 67 and hence, the recording head 65 can be moved from a printing region to a region adjacent thereto.

Reference numeral 51 denotes a feeding part from which recording mediums are inserted, and 52, a feed roller driven by a motor (not shown). With such construction, the recording medium is fed to the position opposing to the ejection opening face of the recording head 65, and, with progress of recording, outputted from an output section provided with an output roller 53.

In the above construction, the cap 62 in the head recovery portion 64 is receded from the path of motion of the recording head 65 when the recording head 65 is returned to its home position, for example, after completion of printing, and the blade 61 remains protruded into the path of motion. As a result, the ejection opening face of the recording head 65 is wiped. When the cap 62 comes into contact with the ejection opening face of the recording head 65 to cap it, the cap 65 is moved so as to protrude into the path of motion of the recording head 65.

When the recording head 65 is moved from its home position to the position at which printing is started, the cap 62 and the blade 61 are at the same positions as the positions for the wiping as described above. As a result, the ejection opening face of the recording head 65 is also wiped at the time of this movement.

The above movement of the recording head 65 to its home position is made not only when the printing is completed or the recording head is recovered for ejection, but also when the recording head is moved between recording regions for the purpose of recording, during which it is moved to the home position adjacent to each recording region at given intervals, where the ejection opening face is wiped in accordance with this movement.

Figure 5:
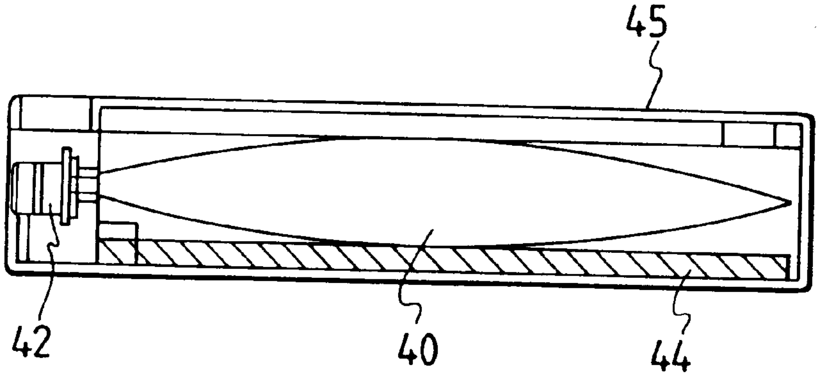
FIG. 5 is a longitudinal cross section of an ink cartridge.

FIG. 5 illustrates an exemplary ink cartridge 45 in which an ink to be fed to the head through an ink-feeding member, for example, a tube is contained. Here, reference numeral 40 designates an ink container portion containing the ink to be fed, as exemplified by a bag for the ink. One end thereof is provided with a stopper 42 made of rubber. A needle (not illustrated) may be inserted into this stopper 42 so that the ink in the bag 40 for the ink can be fed to the head. Reference numeral 44 indicates an ink-absorbing member for receiving a waste ink. It is preferred in the present invention that the ink container portion is formed of a polyolefin, in particular, polyethylene, at its surface with which the ink comes into contact.

The ink-jet recording apparatus according to the present invention is not limited to the apparatus as described above in which the head and the ink cartridge are separately provided. Therefore, a device in which these members are integrally formed as shown in FIG. 6 can also be preferably used.

Figure 6:
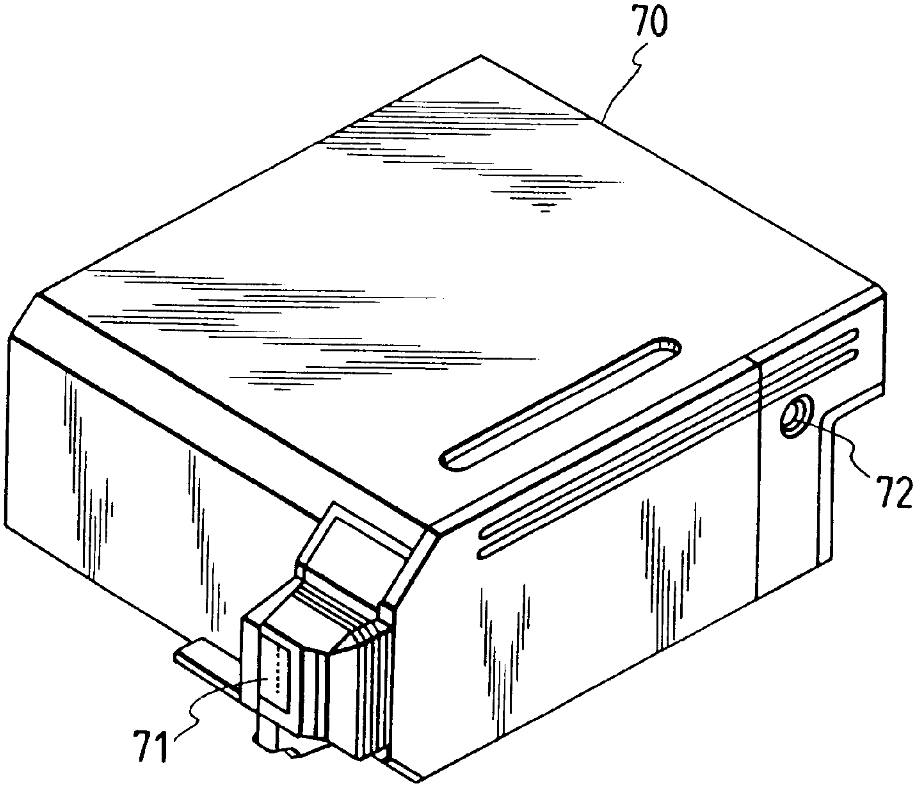
FIG. 6 is a perspective illustration of an example of a recording unit.

In FIG. 6, reference numeral 70 denotes a recording unit, in the interior of which an ink absorber that has held an ink is contained. The recording unit is so constructed that the ink in such an ink absorber is ejected in the form of ink droplets from a head 71 having a plurality of orifices. As a material for the ink absorber, polyurethane may be used, for example. Reference numeral 72 denotes an air path opening through which the interior of the cartridge is made to communicate with the atmosphere.

This recording unit 70 can be used in place of the recording head shown in FIG. 4, and is detachably mounted to the carriage 66.

In the foregoing description, the recording apparatus used in the present invention is exemplified by the ink-jet recording apparatus in which heat energy is applied to the ink to eject ink droplets. Besides, a piezo type ink-jet recording apparatus employing a piezoelectric device can also be similarly used.

Figure 7:
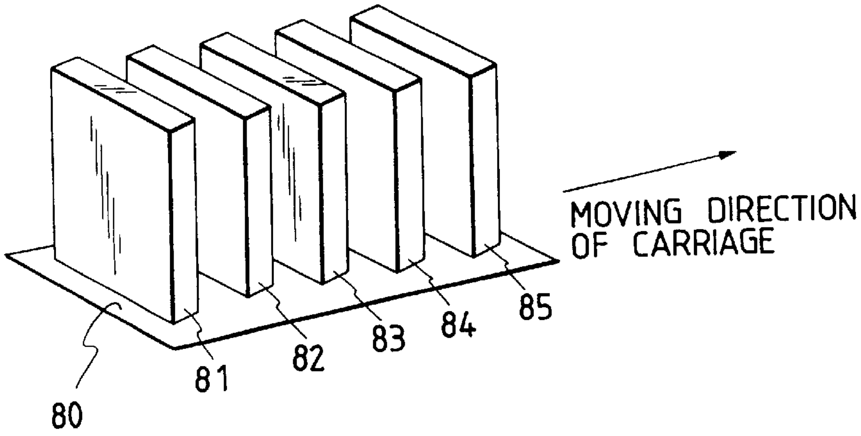
FIG. 7 is a perspective illustration of the recording section in which a plurality of recording heads are arranged.

When the recording process of the present invention is worked, a recording apparatus in which five recording heads comprising the recording head as previously shown in FIG. 3 are arranged on a carriage 80 is used, for example. FIG. 7 shows an example thereof. Reference numerals 81, 82, 83 and 84 denote recording heads for ejecting a yellow ink, a magenta ink, a cyan ink and a black ink, respectively. Reference numeral 85 denotes a recording head for ejecting the liquid formulation. The heads are provided in the recording apparatus described above, and eject the inks of respective colors in accordance with recording signals. Before their ejection, the liquid formulation is previously applied to at least the part where the ink of each color will be applied to the recording medium.

Figure 8:
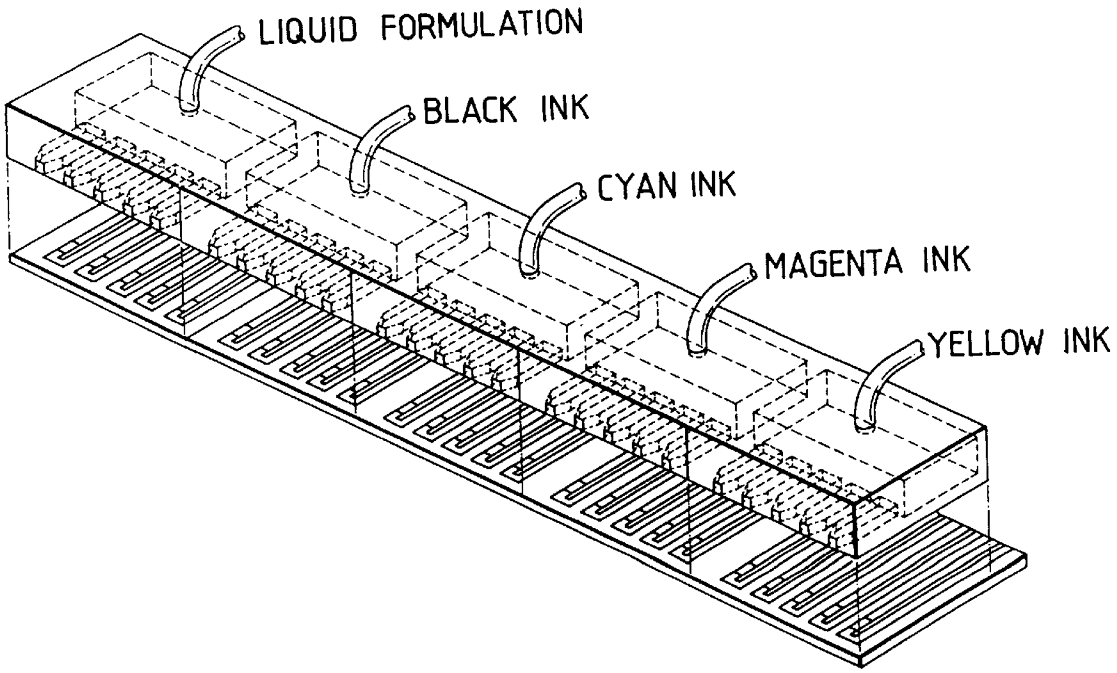
FIG. 8 is a perspective illustration of another embodiment of recording heads used in the present invention.

In FIG. 7, an example is shown in which the five recording heads are used, but is by no means limited to it. An instance is also preferable in which, as shown in FIG. 8, recording is performed using one recording head having separate liquid channels respectively for the yellow, magenta, cyan and black inks and the liquid formulation.

Of course, the heads may also be disposed in the manner that the liquid formulation and inks are ejected in recording order reverse to the order described above.

Figure 9:
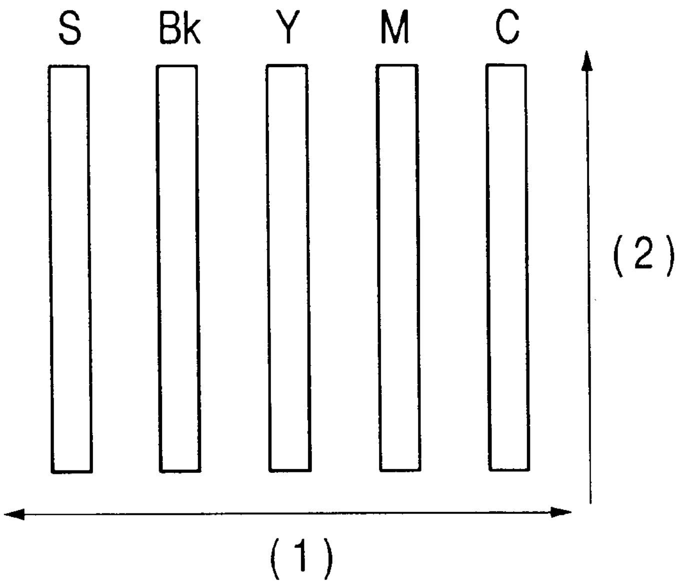
FIG. 9 illustrates a first example of the construction of recording heads.
Figure 10:
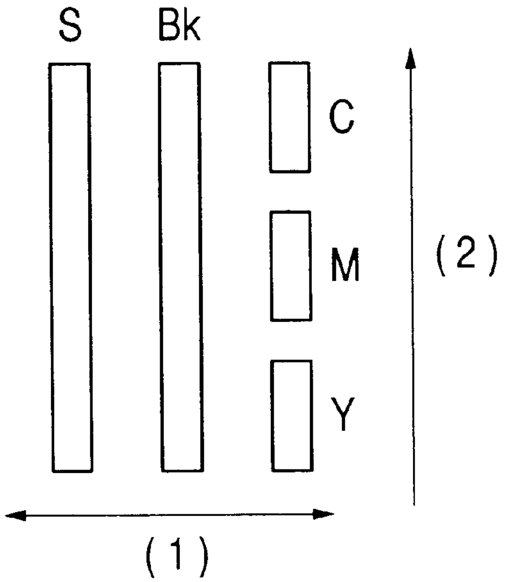
FIG. 10 illustrates a second example of the construction of recording heads.
Figure 11:
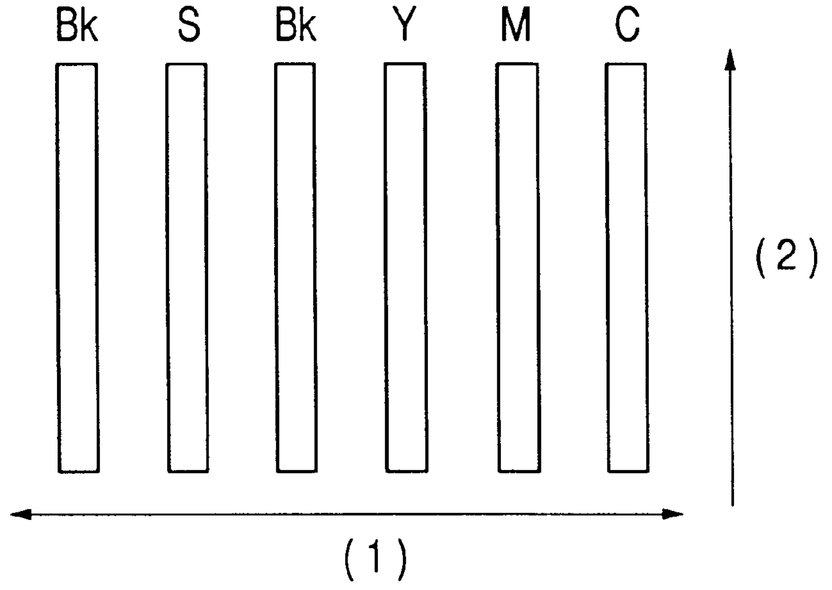
FIG. 11 illustrates a third example of the construction of recording heads.

As specific examples of the disposition of the ink-jet recording heads preferably used in the present invention, it may include three types as shown in FIGS. 9 to 11.

In FIGS. 9 to 11, letter symbols Y, M, C and Bk denote recording heads for ejecting yellow, magenta, cyan and black inks, respectively. Letter symbol S denotes a recording head for ejecting the liquid formulation. The respective recording heads are arranged on a carriage in the same manner as shown in FIG. 7 (but different according to the manner of construction). The respective recording heads are disposed on the recording apparatus described above, and the respective color inks are ejected therefrom in accordance with recording signals. Before or after their ejection, the liquid formulation is made to adhere to at least the areas where the respective color inks adhere to the recording medium. The recording heads are moved by the carriage in the direction of an arrow (1), and the recording medium is moved by feed rollers and so forth in the direction of an arrow (2).

First, FIG. 9 shows a first example of construction, where S, Bk, Y, M and C recording heads are arranged in parallel on the carriage. FIG. 10 shows a second example of construction, comprised of recording heads for liquid formulation and black ink which are arranged in parallel and Y, M and C recording heads which are arranged in parallel to the former's two recording heads and in series to one another. Here, the respective recording heads need not necessarily have the same ejection volume per dot, and the ejection volume per dot (Vd) of each recording head may be controlled so as to provide an optimum recording suitability in accordance with, e.g., the make-up of the liquid formulation. Preferable construction is that the S, Y, M and C recording heads have the same Vd and the Bk recording heads has a Vd twice the former, but without limitation thereto.

In a third example of construction as shown in FIG. 11, Bk, S, Bk, Y, M and C recording heads having the same ejection volume per dot are arranged in parallel on the carriage, so that the ejection quantity of black ink can be twice the ejection quantity of other liquid formulation and color inks. In the construction shown in FIG. 11, too, the S, Bk, Y, M and C recording heads need not necessarily have the same Vd.

In the present invention, the liquid formulation and the ink may be imparted in a shot quantity ratio of 1:1 per unit area on the recording medium in its image forming areas, or may be in a ratio of liquid formulation:ink=1:10 to 8:10. By doing so, solid uniformity of images formed can be achieved. The shot quantity ratio between the liquid formulation and the ink per unit area on the recording medium in its image forming areas can be adjusted, e.g., in the following way: The number of pixels held by the liquid formulation applying onto the recording medium is controlled so as to be in the range of from 10 to 80% of the number of pixels held by the ink applying onto the recording medium; the liquid formulation and the ink are both imparted by ink-jet recording, where the ejection quantity of the liquid formulation is controlled so as to be smaller than the ejection quantity of the ink; or, in combination of these, the number of pixels held by the liquid formulation applying onto the recording medium is controlled so as to be in the range of from 10 to 80% of the number of pixels held by the ink applying onto the recording medium, and also the liquid formulation and the ink are both imparted by ink-jet recording, where the ejection quantity of the liquid formulation is controlled so as to be smaller than the ejection quantity of the ink.

In the present invention, the liquid formulation and the ink are both imparted by ink-jet recording and also heads having a high recording density are used, where the ejection quantity per dot for the both heads are made smaller as in the range of from 2 to 25 pl. By doing so, the ink can be prevented from causing feathering and more detailed images having a higher character quality level can be obtained.

How the liquid composition and the ink are imparted to the recording medium in the ink-jet recording apparatus as previously described will be described below.

The recording process according to the present invention has the two steps of (A) imparting the liquid formulation containing at least the cationic polymer, onto a recording medium, and (B) imparting the ink containing at least the anionic substance, onto the recording medium by ejecting it from ejection orifices in the form of droplets in accordance with recording signals.

The step (A) is carried out in order to achieve both a good character quality level and an improvement of fixation of recorded images formed by the step (B) and also for the purposes of preventing bleeding and improving water fastness of the images. The step (A) may be carried out prior to the step (B), or the step (A) may be carried out after the step (B), without any problem. This is because, whichever step is carried out first, the cationic polymer in the liquid formulation and the anionic substance in the ink mix on the recording medium to form aggregates. From the viewpoint of improving image optical density and fixing performance, it is preferable to carry out the step (A) after the step (B) and subsequently further carry out the step (B).

In the case when the step (A) is carried out prior to the step (B), there are no particular limitations on the time taken after the liquid formulation has been applied to the recording medium and before the ink is applied. In order to make the present invention more effective, the latter may preferably be carried out within several seconds, and particularly preferably within 1 second. The same applies also when the step (A) is carried out after the step (B).

The present invention will be described below in greater detail by giving Examples.

EXAMPLES 1 to 6

Liquid formulations S-1 to S-6 were prepared.

| | |
|---|---|
| S-1 | |
| Polyallylamine (weight average molecular weight: 600) | 4.0% by weight |
| Glycerol | 7.0% by weight |
| Diethylene glycol | 5.0% by weight |
| Acetic acid | 3.5% by weight |
| Water | balance |
| S-2 | |
| Polyallylamine (weight average molecular weight: 600) | 4.0% by weight |
| Benzalkonium chloride (G-50; available from Sanyo Chemical Industries, Ltd.) | 0.5% by weight |
| Glycerol | 7.0% by weight |
| Diethylene glycol | 5.0% by weight |
| Acetic acid | 3.5% by weight |
| Water | balance |
| S-3 | |
| Polyallylamine (weight average molecular weight: 600) | 4.0% by weight |
| Benzalkonium chloride (G-50; available from Sanyo Chemical Industries, Ltd.) | 0.5% by weight |
| Glycerol | 7.0% by weight |
| Diethylene glycol | 5.0% by weight |
| Triethylene glycol monobutyl ether | 3.0% by weight |
| Water | balance |
| S-4 | |
| Polyallylamine (weight average molecular weight: 1,300) | 4.0% by weight |
| Glycerol | 7.0% by weight |
| Diethylene glycol | 5.0% by weight |
| Acetic acid | 3.5% by weight |
| Water | balance |
| S-5 | |
| Polyallylamine (weight average molecular weight: 1,300) | 4.0% by weight |
| Benzalkonium chloride (G-50; available from Sanyo Chemical Industries, Ltd.) | 0.5% by weight |
| Glycerol | 7.0% by weight |
| Diethylene glycol | 5.0% by weight |
| Acetic acid | 3.5% by weight |

-continued

| | |
|---|---|
| Water | balance |
| S-6 | |
| Polyallylamine (weight average molecular weight: 1,300) | 4.0% by weight |
| Benzalkonium chloride (G-50; available from Sanyo Chemical Industries, Ltd.) | 0.5% by weight |
| Glycerol | 7.0% by weight |
| Diethylene glycol | 5.0% by weight |
| Triethylene glycol monobutyl ether | 3.0% by weight |
| Water | balance |

Next, as Bk, Y, M and C inks, color inks Bk-1, Y-1, M-1 and C-1 each having the following composition were prepared.

| | |
|---|---|
| Bk-1 | |
| C.I. Direct Black 168 | 2.5% by weight |
| C.I. Direct Blue 199 | 0.5% by weight |
| C.I. Direct Yellow 86 | 0.3% by weight |
| Glycerol | 8.0% by weight |
| Ethylene glycol | 8.0% by weight |
| Urea | 5.0% by weight |
| Water | balance |
| Y-1 | |
| C.I. Direct Yellow 132 | 2.5% by weight |
| Glycerol | 7.0% by weight |
| Diethylene glycol | 8.0% by weight |
| Acetylene glycol type surface active agent (ACETYLENOL EH, trade name; available from Kawaken Fine Chemicals Co., Ltd.) | 0.7% by weight |
| Water | balance |
| M-1 | |
| C.I. Acid Red 92 | 2.5% by weight |
| Glycerol | 7.0% by weight |
| Diethylene glycol | 8.0% by weight |
| Acetylene glycol type surface active agent (ACETYLENOL EH, trade name; available from Kawaken Fine Chemicals Co., Ltd.) | 0.7% by weight |
| Water | balance |
| C-1 | |
| C.I. Direct Blue 199 | 3.0% by weight |
| Glycerol | 7.0% by weight |
| Diethylene glycol | 8.0% by weight |
| Acetylene glycol type surface active agent (ACETYLENOL EH, trade name; available from Kawaken Fine Chemicals Co., Ltd.) | 0.7% by weight |
| Water | balance |

The liquid formulations and inks thus prepared were ejected from heads constructed in entirely the same manner as shown in the second example of head construction, to carry out color recording at 600 dpi using heads having the following ejection quantities for each ink and liquid formulation.

| | |
|---|---|
| Liquid formulation | 15 pl/dot |
| Bk-1 | 20 pl/dot |
| Y-1 | 15 pl/dot |
| M-1 | 15 pl/dot |
| C-1 | 15 pl/dot |

The positions at which the liquid formulation was applied on the recording medium were electrically controlled so as to be precisely coincide with the positions at which the inks were shot to make a record. As recording media on which images were recorded, sheets of PB paper (paper used for copying machines and ink-jet recording in common), available from CANON INC, were used.

Evaluation was made on the following items, by the following methods and according to the following criteria.

(1) Image optical density:

Image densities at black solid print areas were measured using MacBeth RD915.

An OD (optical density) value of 1.35 or above was evaluated as "AA"; from 1.3 to less than 1.35, as "A"; from 1.2 to less than 1.3, as "B"; and less than 1.2, as "C".

(2) Color bleeding:

Black characters contrasting with a yellow solid print background were printed, and the state of bleeding was visually evaluated. Evaluation results were ranked in the following way.

AA: No bleeding was seen at all.
A: Bleeding slightly occurred, but no problem in practical use.
B: Bleeding occurs and there was a problem in practical use.
C: There was a problem in practical use.

(3) Water fastness:

Solid prints in Bk, Y, M, C, R, G and B were respectively printed, and thereafter, a day after, were dipped in tap water for 3 seconds, followed by drying. OD values at the initial stage and OD values after the test were compared to determine residual OD percentages.

AA: Residual OD value was 95% or more.
A: Residual OD value was from 85% to less than 95%.
B: Residual OD value was from 75% to less than 85%.
C: Residual OD value was less than 75%.

(4) Ejection stability (frequency response) of liquid formulation:

What percent (%) the ejection volume per dot at the time of ejection at a frequency of 8 kHz was with respect to the ejection volume per dot at the time of ejection at a frequency of 100 Hz was examined to make evaluation.

AA: 90% or more.
A: From 80% to less than 90%.
B: From 70% to less than 80%.
C: Less than 70%.

Figure 12:
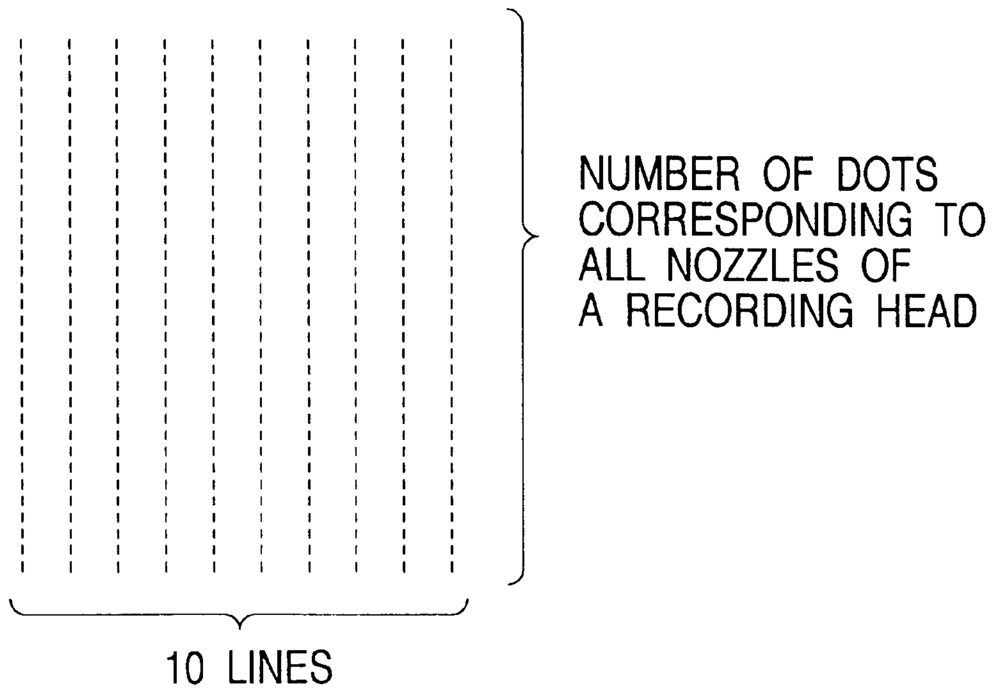
FIG. 12 shows a print pattern used in the evaluation of start-up performance.

(5) Start-up performance of liquid formulation:

Dot lines as shown in FIG. 12 were repeatedly printed to form several lines (10 lines), and then stopped recording for a certain time. Thereafter, the longest pause time after which normal recording was possible in an attempt to again print like patterns was measured to make evaluation of start-up performance. Measured in an environment at 25° C. and 50% RH.

AA: The longest pause time was 10 seconds or more.
A: The longest pause time was from 5 seconds to less than 10 seconds.
B: The longest pause time was from 3 seconds to less than 5 seconds.
C: The longest pause time was less than 3 seconds.

(6) Anti-clogging performance of liquid formulation:

In a state where the recording head and the reservoir were connected, the recording head was capped with a capping rubber and then left to stand in an environment at 35° C. and 10% RH for 2 weeks and thereafter in an environment at 25° C. and 50% RH for 2 hours.

In that state, a usual suction restoration system was used to measure how many times the suction had to be repeated until normal recording was restored, to make evaluation of anti-sticking performance.

AA: Restored after sucking twice at most.
A: Restored after sucking five times at most.
B: Restored after sucking ten times at most.
C: Not ejected from some nozzles whatever times the suction was repeated, and perfectly normal printing was not restored.

Evaluation Results in Examples 1–6 are shown in Table 1.

TABLE 1

| | (1) | (2) | (3) | (4) | (5) | (6) |
|---|---|---|---|---|---|---|
| Example | | | | | | |
| 1 | A | AA | AA | AA | AA | AA |
| 2 | A | AA | AA | AA | AA | AA |
| 3 | A | AA | AA | AA | AA | AA |
| 4 | A | AA | AA | A | A | AA |
| 5 | A | AA | AA | A | A | AA |
| 6 | A | AA | AA | A | AA | AA |

(1): Image optical density
(2): Color bleeding
(3): Water fastness
(4): Ejection stability of liquid formulation
(5): Start-up performance of liquid formulation
(6): Anti-clogging performance of liquid formulation

EXAMPLES 7 to 12

Liquid formulations S-7 to S-12 were prepared. S-7:

| | |
|---|---|
| S-7 | |
| Polyallylamine (weight average molecular weight: 500) | 4.0% by weight |
| Glycerol | 7.0% by weight |
| Diethylene glycol | 5.0% by weight |
| Acetic acid | 3.5% by weight |
| Water | balance |
| S-8 | |
| Polyallylamine (weight average molecular weight: 500) | 4.0% by weight |
| Benzalkonium chloride (G-50; available from Sanyo Chemical Industries, Ltd.) | 1.0% by weight |
| Glycerol | 7.0% by weight |
| Diethylene glycol | 5.0% by weight |
| Acetic acid | 3.5% by weight |
| Water | balance |
| S-9 | |
| Polyallylamine (weight average molecular weight: 500) | 4.0% by weight |
| Benzalkonium chloride (G-50; available from Sanyo Chemical Industries, Ltd.) | 1.0% by weight |
| Glycerol | 7.0% by weight |
| Diethylene glycol | 5.0% by weight |
| Triethylene glycol monobutyl ether | 3.0% by weight |
| Water | balance |
| S-10 | |
| Polyallylamine (weight average molecular weight: 900) | 4.0% by weight |
| Glycerol | 7.0% by weight |
| Diethylene glycol | 5.0% by weight |
| Acetic acid | 3.5% by weight |
| Water | balance |
| S-11 | |
| Polyallylamine (weight average molecular weight: 900) | 4.0% by weight |
| Benzalkonium chloride (G-50; available from Sanyo Chemical Industries, Ltd.) | 1.0% by weight |
| Glycerol | 7.0% by weight |
| Diethylene glycol | 5.0% by weight |
| Acetic acid | 3.5% by weight |
| Water | balance |
| S-12 | |
| Polyallylamine (weight average molecular weight: 900) | 4.0% by weight |

-continued

| | |
|---|---|
| Benzalkonium chloride (G-50; available from Sanyo Chemical Industries, Ltd.) | 1.0% by weight |
| Glycerol | 7.0% by weight |
| Diethylene glycol | 5.0% by weight |
| Triethylene glycol monobutyl ether | 3.0% by weight |
| Water | balance |

As inks, the following Bk-2, Y-2, M-2 and C-2 each having the following composition were used.

| | |
|---|---|
| Bk-2 | |
| C.I. Direct Black 168 | 2.5% by weight |
| C.I. Direct Blue 199 | 0.5% by weight |
| C.I. Direct Yellow 86 | 0.3% by weight |
| Glycerol | 8.0% by weight |
| Ethylene glycol | 8.0% by weight |
| Urea | 5.0% by weight |
| Isopropyl alcohol | 4.0% by weight |
| Water | balance |
| Y-2 | |
| C.I. Direct Yellow 132 | 2.5% by weight |
| Glycerol | 7.0% by weight |
| Diethylene glycol | 8.0% by weight |
| Acetylene glycol type surface active agent (ACETYLENOL EH, trade name; available from Kawaken Fine Chemicals Co., Ltd.) | 0.1% by weight |
| Isopropyl alcohol | 2.5% by weight |
| Water | balance |
| M-2 | |
| C.I. Acid Red 92 | 2.5% by weight |
| Glycerol | 7.0% by weight |
| Diethylene glycol | 8.0% by weight |
| Acetylene glycol type surface active agent (ACETYLENOL EH, trade name; available from Kawaken Fine Chemicals Co., Ltd.) | 0.1% by weight |
| Isopropyl alcohol | 2.5% by weight |
| Water | balance |
| C-2 | |
| C.I. C.I. Direct Blue 199 | 3.0% by weight |
| Glycerol | 7.0% by weight |
| Diethylene glycol | 8.0% by weight |
| Acetylene glycol type surface active agent (ACETYLENOL EH, trade name; available from Kawaken Fine Chemicals Co., Ltd.) | 0.1% by weight |
| Isopropyl alcohol | 2.5% by weight |
| Water | balance |

Characters were printed at 600 dpi using heads constructed in the same manner as shown in the third example of head construction, the heads having the following ejection quantities per dot.

| | |
|---|---|
| Liquid formulation | 7 pl/dot |
| Bk-2 | 15 pl/dot |
| Y-2 | 7 pl/dot |
| M-2 | 7 pl/dot |
| C-2 | 7 pl/dot |

The image quality, reliability of liquid formulation and other performances were evaluated on the same items and by the same manner as Examples 1 to 6.

Evaluation Results in Examples 7–12 are shown in Table 2.

TABLE 2

| | (1) | (2) | (3) | (4) | (5) | (6) |
|---|---|---|---|---|---|---|
| Example | | | | | | |
| 7 | AA | AA | AA | AA | A | AA |
| 8 | AA | AA | AA | AA | A | AA |
| 9 | AA | AA | AA | AA | AA | AA |
| 10 | AA | AA | AA | A | A | A |
| 11 | AA | AA | AA | A | A | A |
| 12 | AA | AA | AA | A | AA | A |

(1): Image optical density
(2): Color bleeding
(3): Water fastness
(4): Ejection stability of liquid formulation
(5): Start-up performance of liquid formulation
(6): Anti-clogging performance of liquid formulation As specifically described above by giving Examples, in the color ink-jet recording made on a recording medium by using a liquid formulation and inks in combination, the former being different from an ink, in particular, in the color ink-jet recording carried out using the recording head having an ink ejection volume per dot of from 2 to 25 pl, it is possible to provide an ink-jet recording process in which a high image optical density, a high image uniformity, a good color bleeding prevention and a high water fastness can be achieved, at the same time the liquid formulation different from an ink can be stably ejected at a high reliability with respect to the recording head which ejects it, i.e., over the range having a high frequency, and also such ejection stability can be maintained even with changes in surrounding environmental conditions, promising superior anti-sticking performance, durability and so forth.

What is claimed is:

1. An ink-jet recording process for forming a color image on a recording medium using a liquid formulation and a color ink in combination, wherein said liquid formulation contains a cationic polymer having a weight-average molecular weight in the range of from 400 to 1,400, and said liquid formulation and said ink are each ejected from a recording head having an ink ejection volume per dot of from 2 to 25 picolitters.

2. The ink-jet recording process according to claim 1, wherein said cationic polymer is polyallylamine.

3. The ink-jet recording process according to claim 1, wherein said liquid formulation further contains a quaternary amine having 8 or more carbon atoms.

4. The ink-jet recording process according to claim 3, wherein said quaternary amine is benzalkonium chloride.

5. The ink-jet recording process according to claim 1, wherein said ink is an aqueous ink.

6. The ink-jet recording process according to claim 1, wherein said liquid formulation further contains a triethylene glycol monoalkyl ether or a diethylene glycol monoalkyl ether.

7. The ink-jet recording process according to claim 1, wherein said liquid formulation is an aqueous liquid formulation.

8. The ink-jet recording process according to claim 6, wherein said triethylene glycol monoalkyl ether or diethylene glycol monoalkyl ether is contained in an amount ranging from 0.5% by weight to 5% by weight.

9. The ink-jet recording process according to claim 1, wherein said liquid formulation further contains glycerol.

10. The ink-jet recording process according to claim 1, wherein said liquid formulation has a pH in the range of from 3 to 11.

11. The ink-jet recording process according to claim 1, wherein said liquid formulation has a pH in the range of from 6 to 9.

12. The ink-jet recording process according to claim 1, wherein said ink comprises a plurality of inks used in combination which are selected from the group consisting of yellow ink, magenta ink, cyan ink and black ink.

13. The ink-jet recording process according to claim 1, wherein said ink is an aqueous ink containing a dye having an anionic group.

14. The ink-jet recording process according to claim 1, wherein said ink is an aqueous ink containing an anionic compound and a pigment.

15. The ink-jet recording process according to claim 1, wherein said liquid formulation is ejected prior to the ejection of said ink.

16. The ink-jet recording process according to claim 1, wherein said liquid formulation is ejected after the ejection of said ink.

17. The ink-jet recording process according to claim 1, wherein ejection of said ink, ejection of said liquid formulation and ejection of said ink are successively carried out.

18. The ink-jet recording process according to claim 1, wherein said recording head ejects said liquid formulation and said ink by applying heat energy to them.

* * * * *

UNITED STATES PATENT AND TRADEMARK OFFICE

CERTIFICATE OF CORRECTION

PATENT NO. : 6,027,210

DATED : February 22, 2000

INVENTOR(S) : YUTAKA KURABAYASHI, ET AL.

It is certified that error appears in the above-identified patent and that said Letters Patent is hereby corrected as shown below:

<u>COLUMN 1</u>:

Line 59, "cause" should read --causes--.
Line 66, "undesirably." should be deleted.

<u>COLUMN 3</u>:

Line 7, "(picolitter" should read --(picoliter)--.
Line 18, "(picolitter)." should read --(picoliter).--.

<u>COLUMN 4</u>:

Line 20, "become very" should read --becomes much--.
Line 31, "mix" should read --mix with--.
Line 63, "difficult stuck" should read --unlikely to stick--.

<u>COLUMN 8</u>:

Line 61, "too," should be deleted.

<u>COLUMN 11</u>:

Line 46, "cap 65" should read --cap 62--.

UNITED STATES PATENT AND TRADEMARK OFFICE

CERTIFICATE OF CORRECTION

PATENT NO. : 6,027,210

DATED : February 22, 2000

INVENTOR(S) : YUTAKA KURABAYASHI, ET AL.

It is certified that error appears in the above-identified patent and that said Letters Patent is hereby corrected as shown below:

COLUMN 15:

Line 66, "be" should be deleted.

COLUMN 17:

Line 28, "S-7:" should be deleted.

COLUMN 18:

Line 41, "C.I. C.I." should read --C.I.--.

COLUMN 19:

Line 42, "picolitters" should read --picoliters-.

Signed and Sealed this

Seventeenth Day of April, 2001

Attest:

NICHOLAS P. GODICI

Attesting Officer

*Acting Director of the United States Patent and Trademark Office*